UNITED STATES PATENT OFFICE.

HOWARD F. CHAPPELL, OF NEW YORK, N. Y., ASSIGNOR TO MINERAL PRODUCTS CORPORATION, OF NEW YORK, N. Y., A CORPORATION OF MAINE.

MANUFACTURE OF REFRACTORY BODIES.

1,226,750.   Specification of Letters Patent.   Patented May 22, 1917.

No Drawing.   Application filed November 15, 1916.   Serial No. 131,395.

*To all whom it may concern:*

Be it known that I, HOWARD F. CHAPPELL, a citizen of the United States, residing in the borough of Manhattan, city, county, and State of New York, have invented certain new and useful Improvements in the Manufacture of Refractory Bodies; and I do hereby declare the following to be a full, clear, and exact description of the invention, such as will enable others skilled in the art to which it appertains to make and use the same.

The present invention relates to refractory materials in the form of furnace linings, slabs, bricks, and other analogous shapes, and is particularly designed to furnish a product of great resistance to heat, and which is likewise neutral, even at high furnace temperatures, to iron and silica, for which reason it is particularly adapted for use where the corrosive effect of either iron or silica upon the furnace lining elements is to be apprehended.

In carrying the invention into practice, I proceed from native alunite, that is to say, from raw alunite as mined, and which is usually associated with minor quantities of the rhyolite or like rock of a highly silicious character accompanying it. The invention is based upon the discovery that by suitably calcining and leaching this mined material, a resultant product is obtained which can be utilized in the manufacture of refractory bricks and other shapes, without the aid of any additional binding agent, and of a resistivity to heat closely approximating the melting point of alumina. So also, I have ascertained that by homogeneously incorporating with the calcined and leached product an appropriate quantity of fire clay, bricks and other refractory shapes may be produced having additional resistance to abrasion, although at some sacrifice to resistance to fusion.

In the practice of the invention, the mined alunite, suitably crushed, and screened to say ¾-inch mesh or thereabout, may be conveniently calcined in a rotary kiln, slightly inclined from the horizontal, and of the type and dimensions of rotary kilns employed in the cement-burning industry. The rotary kiln may be heated, in the usual manner, by the combustion of pulverized coal, oil, or gas, introduced at its lower end, and the charge of crushed and screened alunite may be admitted at the upper end of the kiln and is fed progressively downward to the lower or discharge end by reason of the kiln's rotation. During its passage through the kiln, the sulfur combined with the alumina is driven off, in its substantial entirety, as sulfurous anhydrid and sulfuric anhydrid by calcination and, in most instances, (dependent upon the temperature prevailing in the kiln) a portion of the potash may likewise be volatilized and driven off. Under usual conditions of temperature, however, the larger part of the potash, mainly in the form of soluble potassium sulfate, remains in the calcine. The calcined alunite is then digested. and leached with water for the recovery of the soluble potash, and is filter-pressed in any suitable manner, as, for instance, in a filter-press of the well-known Kelly type. The filter-cake may then be readily detached from the leaves of the filter-press, by steam, and comprises the material from which the refractory bricks or other shapes are made.

The calcined and leached product constituting the filter-cake is made up of particles of fine sub-division and is unctuous to the touch. It has the appearance of a relatively dry material, even when freshly delivered from the filter-press. Nevertheless, at that time, and even when subsequently exposed in heaps to air-drying for many days under a hot sun, the material actually contains a considerable quantity of moisture, amounting in most instances, to from 25% to 35%.

I have discovered that, in contradistinction to other forms of alumina, the calcined and leached alunite, as delivered from the filter-press or as subsequently air-dried may be pugged in a pug mill and molded into bricks and other shapes, for subsequent firing, without the addition of any further binding material whatever, and that these shapes may then be converted into the final refractory products, without cracking or other deterioration.

The calcined, leached, and filter-pressed alunite has a greater tendency to retain moisture than has ordinary fire-clay, and corresponding care should be used in the preliminary drying of the pugged molded shapes before raising them to the higher ranges of temperature, as will be understood by those skilled in the art. So also, in general, owing to its heat-insulating properties, a longer time of exposure to high temperatures is required to saturate with heat a unit volume of this material than would be required for a like volume of fire-clay. The firing temperature is raised to such a degree as to cause the particles to bond together throughout the mass. As hereinbefore indicated, if it is desired to increase the toughness or resistance to abrasion of bricks made from the calcined and leached alunite, a quantity of fire-clay, which may amount to as high as 25% or more by volume of the calcined leached alunite may be added.

It will be understood that, in the calcining operation, as commercially practised, the driving off of the sulfur combined with the alumina, is not always quantitative, and that some of the potash salts are frequently expelled from the calcine by volatilization. So also, in commercial practice, a residual amount of potash, sometimes amounting to as high as 3% or 4%, may be left in the leached calcine. These incidents of the calcining and leaching operations, however, are apparently without material effect upon the quality of the final refractory product and introduce no substantial difficulties in obtaining products having the characteristics desired.

What I claim is:

1. The method of producing refractory bodies, which comprises calcining alunite, leaching the calcine, molding the leached product into the desired form, and heating it to such a high temperature as to cause the bonding cohesion of the particles of the molded mass; substantially as described.

2. The method of producing refractory bodies, which comprises calcining alunite, leaching the calcine, adding fire-clay thereto, then molding the resultant product into the desired form and heating it to such a high temperature as to cause the bonding cohesion of the particles of the molded mass; substantially as described.

3. A refractory body, comprising leached calcined alunite whose particles have been brought, by heating, into bonding cohesion throughout the mass; substantially as described.

4. A refractory body, comprising leached calcined alunite, in combination with fire-clay intimately admixed therewith, the particles of the compound mass having been brought, by heating, into bonding cohesion throughout; substantially as described.

In testimony whereof I affix my signature.

HOWARD F. CHAPPELL.